(12) United States Patent
Kerofsky et al.

(10) Patent No.: US 8,860,744 B2
(45) Date of Patent: Oct. 14, 2014

(54) SYSTEM FOR IMAGE ENHANCEMENT (75) Inventors: Louis Joseph Kerofsky, Camas, WA (US); Xinyu Xu, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 242 days.

(21) Appl. No.: 13/435,311

(22) Filed: Mar. 30, 2012

(65) Prior Publication Data

US 2013/0257886 A1 Oct. 3, 2013

(51) Int. Cl.
*G06T 5/40* (2006.01)

(52) U.S. Cl.
USPC .......................................................... 345/589

(58) Field of Classification Search
CPC .............. G06T 5/00; G06T 5/40; G09G 5/10; H04N 5/58; H04N 5/66
See application file for complete search history.

(56) References Cited

U.S. PATENT DOCUMENTS

| | | | |
|---|---|---|---|
| 6,317,521 B1 | 11/2001 | Gallagher et al. | |
| 6,762,742 B2 | 7/2004 | Moon et al. | |
| 7,079,281 B1 | 7/2006 | Ng et al. | |
| 7,391,906 B2 | 6/2008 | Blake et al. | |
| 7,508,993 B2 * | 3/2009 | Yuan et al. | 382/274 |
| 7,515,160 B2 | 4/2009 | Kerofsky | |
| 2003/0016880 A1* | 1/2003 | Nakakuki | 382/266 |
| 2006/0020203 A1 | 1/2006 | Tamura | |
| 2008/0101716 A1* | 5/2008 | Ho | 382/266 |
| 2009/0092325 A1* | 4/2009 | Brown Elliott et al. | 382/232 |
| 2009/0167673 A1* | 7/2009 | Kerofsky | 345/102 |
| 2010/0039414 A1 | 2/2010 | Bell | |
| 2010/0098339 A1 | 4/2010 | Kido | |
| 2010/0295864 A1* | 11/2010 | Kerofsky et al. | 345/589 |
| 2011/0115815 A1 | 5/2011 | Xu et al. | |

OTHER PUBLICATIONS

International Search Report, mailed Jun. 11, 2013, PCT International Patent App. No. PCT/JP2013/002064, Sharp Kabushiki Kaisha, 3 pgs.

* cited by examiner

*Primary Examiner* — Kee M Tung
*Assistant Examiner* — Xin Sheng
(74) *Attorney, Agent, or Firm* — Chernoff Vilhauer McClung & Stenzel, LLP (57) ABSTRACT

A computer-implemented method for enhancing an input image that includes modifying the relatively lower frequency aspects of the input image based upon a brightening process, where the brightening process is based upon a brightening selection which is based upon a combination of an under brightening term and a clipping term and a joint saturation boost and brightening. The method modifies the relatively higher frequency aspects of the input image based upon reducing lower amplitude noise and enhancing the noise reduced higher frequency aspects of the input image, and combines the modified relatively lower frequency aspects of the input image and the modified relatively higher frequency aspects of the input image.

10 Claims, 12 Drawing Sheets

SYSTEM FOR IMAGE ENHANCEMENT

FIELD OF THE INVENTION

The present invention relates generally to image enhancement.

BACKGROUND

Low-contrast viewing conditions may negatively impact, for example, through eyestrain and fatigue, the viewing experience of a user of an LCD device, for example, an LCD television, an LCD mobile device and other devices comprising an LCD display.

Low-contrast viewing conditions may arise when a device is used in an aggressive power-reduction mode, wherein the LCD backlight power level may be dramatically reduced making the image/video content appear dark and less visible to a viewer. The contrast of the image/video may be vastly reduced, or in some cases, pegged at black, and many image features that may convey important scene content may fall below the visible threshold.

Low-contrast viewing conditions may also arise when an LCD display is viewed under high ambient light, for example, direct sunlight. In these situations, the minimum display brightness that a viewer may perceive may be elevated due to the high ambient light in the surroundings. The image/video may appear "washed out" where it is intended to be bright, and the image/video may appear featureless in darker regions.

For both of the above-described low-contrast viewing scenarios, and other low-contrast viewing scenarios, the tonal dynamic range of the image/video may be compressed and the image contrast may be greatly reduced, thereby degrading the viewing experience of the user. Due to increasing consumer concern for reduced energy costs and demand for device mobility, it may be desirable to provide improved digital imagery and video quality to enhance the viewing experience under low-contrast viewing conditions.

DETAILED DESCRIPTION OF EXEMPLARY EMBODIMENTS

Low-contrast viewing conditions may negatively impact, for example, through eyestrain and fatigue, the viewing experience of a user of an LCD device, for example, an LCD television, an LCD mobile device and other devices comprising an LCD display.

Figure 1:
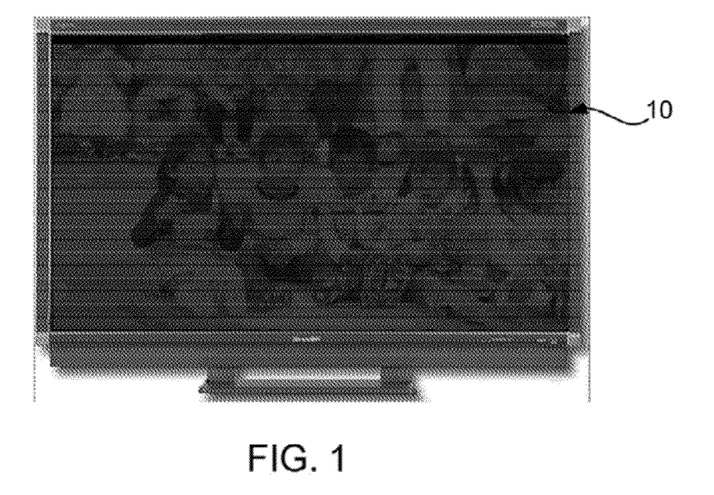
FIG. 1 is a picture depicting an exemplary image under a low back-light-power viewing condition.

Low-contrast viewing conditions may arise when a device is used in an aggressive power-reduction mode, wherein the LCD backlight power level may be dramatically reduced making the image/video content appear dark and less visible to a viewer. The contrast of the image/video may be vastly reduced, or in some cases, pegged at black, and many image features that may convey important scene content may fall below the visible threshold. FIG. 1 depicts an exemplary image 10 displayed on a device operating under aggressive power-mode reduction.

Figure 2:
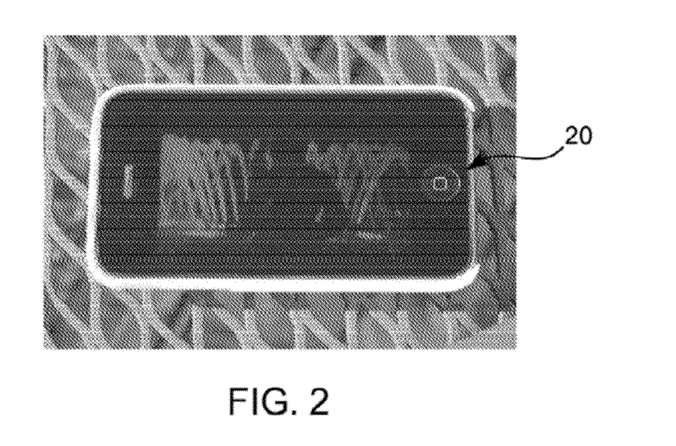
FIG. 2 is a picture depicting an exemplary image under a high ambient-light viewing condition.

Low-contrast viewing conditions may also arise when an LCD display is viewed under high ambient light, for example, direct sunlight. In these situations, the minimum display brightness that a viewer may perceive may be elevated due to the high ambient light in the surroundings. The image/video may appear "washed out" where it is intended to be bright, and the image/video may appear featureless in darker regions. FIG. 2 depicts an exemplary image 20 viewed with a mobile phone under high ambient lighting (direct sunlight).

For both of the above-described low-contrast viewing scenarios, and other low-contrast viewing scenarios, the tonal dynamic range of the image/video may be compressed and the image contrast may be greatly reduced, thereby degrading the viewing experience of the user. Due to increasing consumer concern for reduced energy costs and demand for device mobility, it may be desirable to provide improved digital imagery and video quality to enhance the viewing experience under low-contrast viewing conditions.

Figure 3:
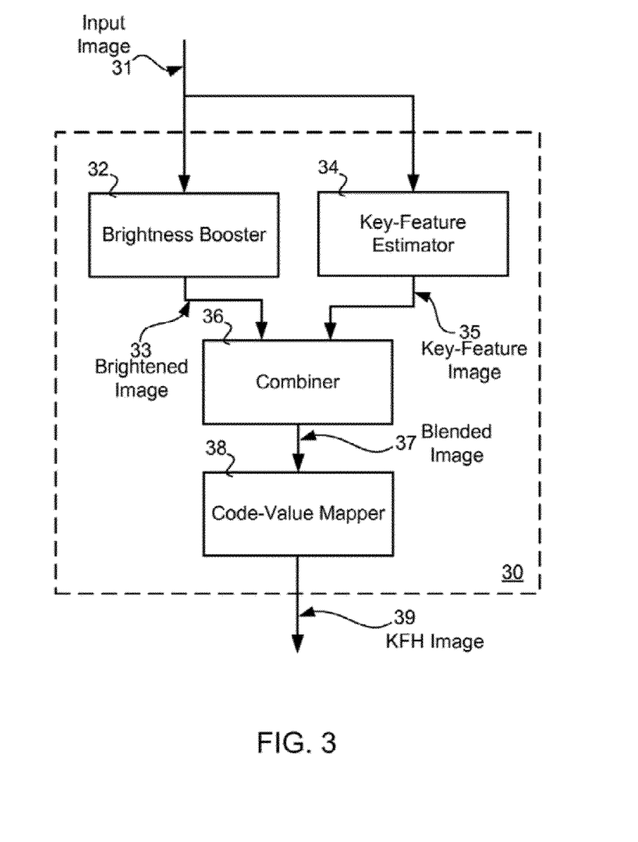
FIG. 3 is a chart showing a brightness booster for boosting the brightness level of an input image, a key-feature estimator for estimating a key-feature map associated with the input image and a combiner for combining the brightness-boosted image and the key-feature map.

Referring to FIG. 3 to increase the visibility of image/video features in low-contrast viewing conditions by highlighting key image features with Non-Photorealistic Rendering (NPR) techniques. This may include an image-enhancement system 30 comprising a brightness booster 32, a key-feature estimator 34, a combiner 36 and a code-value mapper 38. The image-enhancement system 30 may receive an input image 31 and may make the input image 31 available to the brightness booster 32 and the key-feature estimator 34. The input image 31 may be a color image, for example, an RGB image. The input image 31 may be a gray-scale image. The input image 31 may be a still image or a frame of a video sequence.

The brightness booster 32 may boost the brightness of the input image 31 using a brightness preservation technique, and the brightness booster 32 may generate a brightened image 33 that may be made available to the combiner 36. The brightness booster 32 may boost the brightness of the input image 31 based on information related to an LCD backlight associated with an LCD display on which the enhanced image may be displayed.

The key-feature estimator 34 may estimate a key-feature image 35, also referred to as a key-feature map, from the input image 31 and may make the key-feature image 35 available to the combiner 36.

The combiner 36 may blend the brightened image 33 and the key-feature image 35 to form a blended image 37 which may be made available to the code-value mapper 38. The code-value mapper 38 may form a key-feature-highlighted (KFH) image 39 by mapping the code-values generated by the combiner 36 into code values appropriate for an LCD, for example, to the range of [0,255]. The KFH image 39 may be made directly available to the LCD for display. The KFH image 39 may also be referred to as an NPR image.

Figure 4:
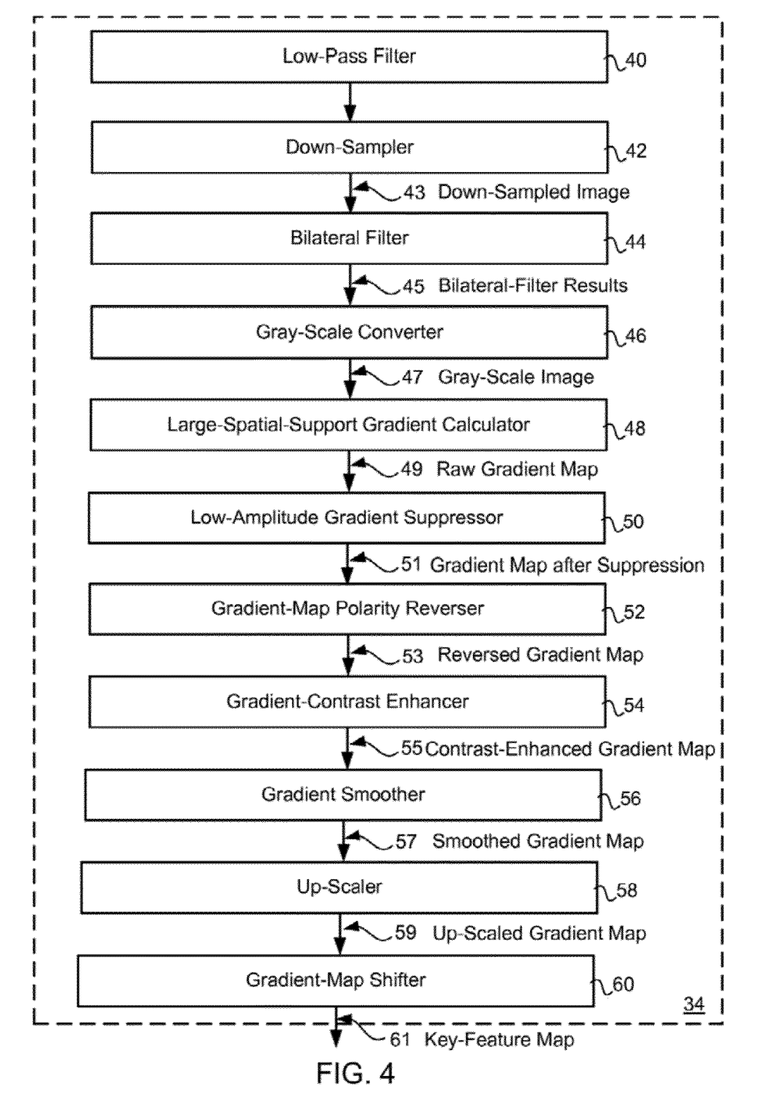
FIG. 4 is a chart showing a gradient estimator comprising a large-spatial-support gradient calculator.

Referring to FIG. 4, the key-feature estimator 34 may comprise a low-pass filter 40 and a down-sampler 42 for reducing, if necessary, the resolution of the input image to a resolution that may allow near real-time processing. Exemplary low-pass filters may include neighborhood pixel-value averaging, Gaussian smoothing, median blur filtering and other low-pass filters known in the art. A low-pass filter may be selected based on computational limitations and/or system resources. Exemplary down-samplers may comprise removal of image rows, removal of image columns, bilinear image resizing, bicubic image resizing, Gaussian pyramid down-samplers and other down-samplers. A down-sampler may be selected based on computational limitations and/or system resources. A key-feature estimator may not reduce the resolution of the input image, and may, therefore, not comprise a low-pass filter and a down-sampler.

The down-sampled image 43 may be made available to a bilateral filter 44 which may smooth less-textured areas. Major contours of objects within an image may convey important image information, while less-textured areas may be perceptually less important to a viewer. Thus bilateral filtering may be used to remove unnecessary gradient information, while retaining key edge information corresponding to object contours.

The results 45 of the bilateral filtering may be converted to gray-scale values by a gray-scale converter 46, and gradient estimation may be performed on the gray-scale image 47 by a large-spatial-support gradient calculator 48. Commonly used edge detectors, for example, the Sobel operator, the Canny edge detector and the Laplacian operator, may not effectively detect edges associated with major contours. Use of these common edge detectors may result in broken lines on major object contours. Additionally, minor edges may be detected in less-textured image areas, which may not be desirable in KFH rendering. Further, object boundaries in a gradient map generated using one of the commonly used edge detectors may not be well defined. The system may compute image gradients using a large spatial support and may retain, as edge pixels, only pixels with a large gradient value.

The large-spatial-support gradient calculator 48 may comprise a horizontal-gradient calculator and a vertical-gradient calculator. At each pixel in the gray-scale image 47, a horizontal-gradient value may be determined by the horizontal-gradient calculator and a vertical-gradient value may be determined by the vertical-gradient calculator. A gradient value may be assigned to a pixel based on the determined horizontal-gradient value and the determined vertical-gradient value associated with the pixel. The gradient value assigned to a pixel may be the largest of the horizontal-gradient value and the vertical-gradient value associated with the pixel.

Figure 5:
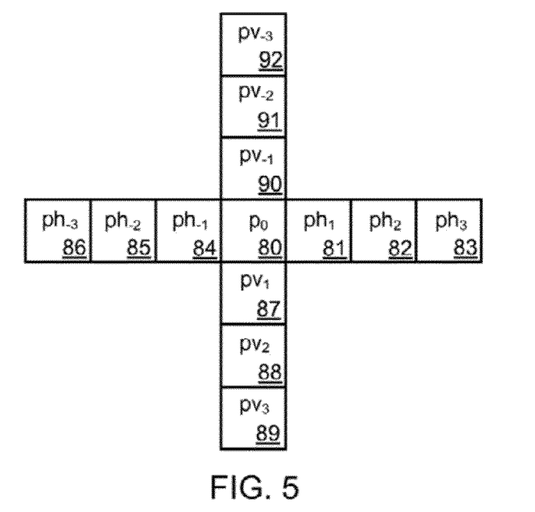
FIG. 5 is a picture depicting an exemplary large-spatial support, associated with a pixel location, used in a gradient calculation.

The horizontal-gradient value associated with a pixel may be determined by computing a first-order derivative at the pixel with respect to several horizontal neighbors in each direction, to the left and to the right, of the pixel. The largest derivative value in each direction may be added together to form the horizontal-gradient value associated with the pixel. Similarly, the vertical-gradient value associated with a pixel may be determined by computing a first-order derivative at the pixel with respect to several vertical neighbors in each direction, above and below, the pixel. The largest derivative value in each direction may be added together to form the vertical-gradient value associated with the pixel. The size of the one-dimensional search window associated with a direction (left, right, above, below) may be three pixels. FIG. 5 illustrates the large spatial support for an exemplary embodiment in which the one-dimension search window is three pixels. For a pixel denoted $p_0$ 80, the horizontal-gradient value, $grad_H(p_0)$, may be determined according to:

$$grad_H(p_0) = \max[D^1(p_0, ph_1), D^1(p_0, ph_2), D^1(p_0, ph_3)] + \max[D^1(p_0, ph_{-1}), D^1(p_0, ph_{-2}), D^1(p_0, ph_{-3})]$$

and the vertical-gradient value, $grad_v(p_0)$, may be determined according to:

$$grad_v(p_0) = \max[D^1(p_0, pv_1), D^1(p_0, pv_2), D^1(p_0, pv_3)] + \max[D^1(p_0, pv_{-1}), D^1(p_0, pv_{-2}), D^1(p_0, pv_{-3})]$$

where $D^1(\cdot, \cdot)$ may denote the first-order derivative and $ph_1$ 81, $ph_2$ 82 and $ph_3$ 83 are the pixels in the one-dimensional search window to the right of the pixel $p_0$ 80, $ph_{-1}$ 84, $ph_{-2}$ 85 and $ph_{-3}$ 86 are the pixels in the one-dimensional search window to the left of the pixel $p_0$ 80, $pv_1$ 87, $pv_2$ 88 and $pv_3$ 89 are the pixels in the one-dimensional search window below the pixel $p_0$ 80 and $pv_{-1}$ 90, $pv_{-2}$ 91 and $pv_{-3}$ 92 are the pixels in the one-dimensional search window above the pixel $p_0$ 80. The final raw gradient value, $grad(p_0)$, associated with the pixel $p_0$ 80 may be determined according to:

$$grad(p_0) = \max[grad_H(p_0), grad_v(p_0)],$$

thereby producing a raw gradient map 49.

Figure 6:
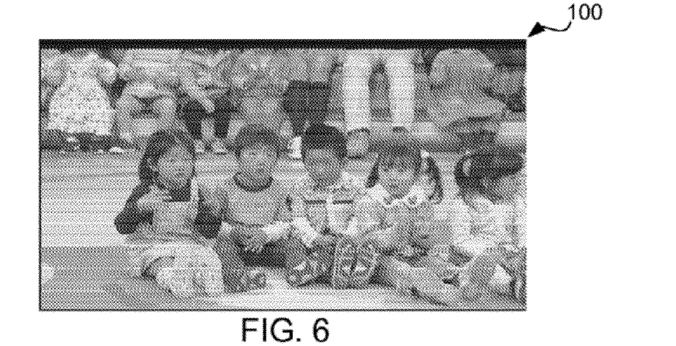
FIG. 6 is a picture depicting an input image.
Figure 7:
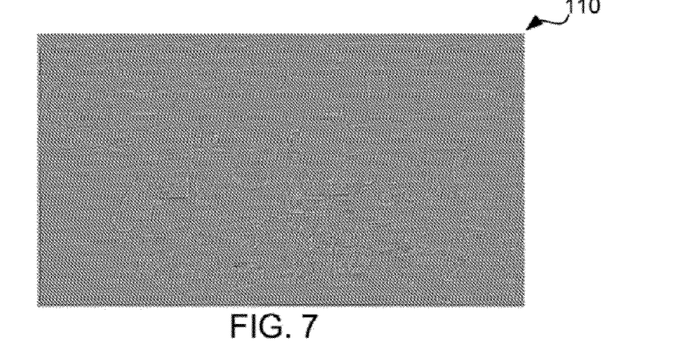
FIG. 7 is a picture depicting a raw gradient map for the exemplary input image shown in FIG. 6.

FIG. 6 shows an exemplary image 100, and FIG. 7 shows the resulting raw gradient map 110 for the exemplary image 100 shown in FIG. 6, using a three-pixel search window.

Figure 8:
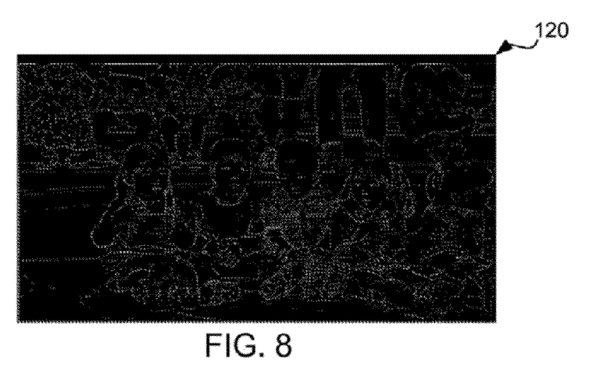
FIG. 8 is a picture depicting a gradient map after suppressing low-amplitude gradients in the raw gradient map shown in FIG. 7.

The raw gradient map 49 may contain noisy details. Therefore, the raw gradient map 49 may be made available to a low-amplitude gradient suppressor 50 which may remove low-amplitude gradients. The low-amplitude gradient suppressor 50 may comprise a comparator that compares the gradient amplitude to a threshold according to:

$$grad_{suppress}(p_0) = \begin{cases} grad(p_0), & grad(p_0) > T \\ 0, & \text{otherwise,} \end{cases}$$

where T may denote a threshold and $grad_{suppress}(p_0)$ may denote the low-amplitude-gradient-suppressed gradient map. The threshold may be set to T=5.0. The low-amplitude gradient suppressor 50 may comprise a zero-crossing detector, and pixel locations associated with zero-crossings may be retained in the gradient map, while non-zero-crossings may be suppressed. FIG. 8 shows the resulting gradient map 120 after suppressing low-amplitude gradients, by thresholding, in the raw gradient map 110 shown in FIG. 7.

Figure 9:
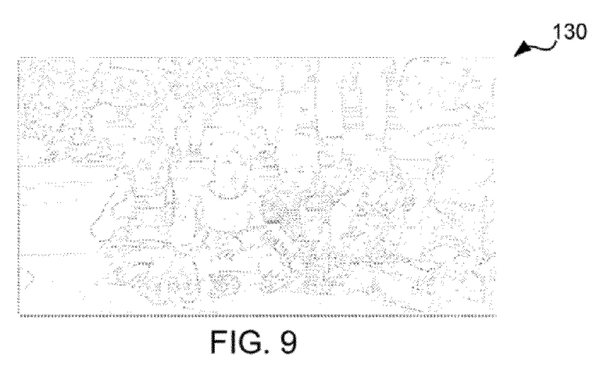
FIG. 9 is a picture depicting a reversed gradient map generated by polarity reversion applied to the exemplary gradient map shown in FIG. 8.

The low-amplitude-gradient-suppressed gradient map 51 may be made available to a gradient-map polarity reverser 52 that may reverse the gradient polarity according to:

$$grad_{rev}(p_0) = \text{offset} - grad_{suppress}(p_0),$$

where offset may denote an offset parameter that may be associated with white background and $grad_{rev}(p_0)$ may denote the reversed gradient map. The parameter offset may be determined empirically, such as offset=120. FIG. 9 shows the outcome 130 of polarity reversion applied to the exemplary gradient map 120 shown in FIG. 8.

The reversed gradient map 53 may be made available to a gradient-contrast enhancer 54 that may improve the contrast of the reversed gradient map 53 and may map the gradient values to the range of 0 to 255. The gradient-contrast enhancer 54 may map the reversed gradient values according to:

$$grad_{enhanced}(p_0) = \begin{cases} 255, & grad_{rev}(p_0) = \text{offset} \\ 0, & grad_{rev}(p_0) \leq 0 \\ grad_{rev}(p_0) + \text{shift}, & 0 < grad_{rev}(p_0) < \text{offset,} \end{cases}$$

where shift may denote a contrast shift and $grad_{enhanced}(p_0)$ may denote the contrast-enhanced gradient map. The parameter shift may be determined empirically, such as shift=120.

The gradient-contrast enhancer 54 may produce a binary gradient map according to:

$$grad_{enhanced}(p_0) = \begin{cases} 255, & grad_{rev}(p_0) = \text{offset} \\ 0, & grad_{rev}(p_0) < \text{offset.} \end{cases}$$

Figure 10:
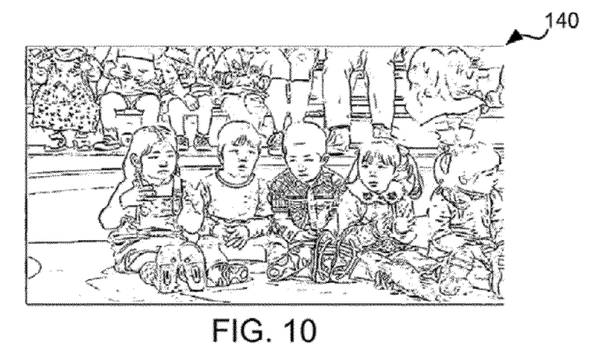
FIG. 10 is a picture depicting a contrast-enhanced gradient map associated with the reversed gradient map shown in FIG. 9.

FIG. 10 shows the outcome 140 of gradient-contrast enhancement applied to the exemplary reversed gradient map 130 shown in FIG. 9.

Figure 11:
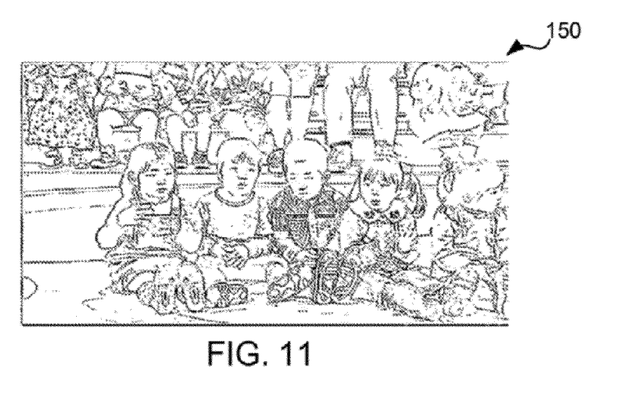
FIG. 11 is a picture depicting the effect of gradient smoothing applied to the contrast-enhanced gradient map shown in FIG. 10.

The contrasted-enhanced gradient map 55 may be made available to a gradient smoother 56 that may blur the boundary between foreground edges and white background and may link broken lines. The gradient smoother 56 may comprise a Gaussian low-pass filter. The kernel size of the Gaussian low-pass filter may be 3×3. FIG. 11 shows the effect 150 of gradient smoothing applied to the exemplary contrast-enhanced gradient map 140 shown in FIG. 10.

The smoothed gradient map 57 may be made available to an up-scaler 58 that may scale the smoothed gradient map 57 to the original input image resolution. The up-scaled gradient map 59 may be made available to a gradient-map shifter 60 that may shift the background of the gradient map to zero. The gradient-map shifter 60 may subtract 255 from the up-scaled gradient values to shift the background to zero. The resulting key-feature map 61 may be made available from the key-feature estimator 34 to the combiner 36.

Referring to FIG. 3, the brightness booster 32 may boost the brightness of the input image 31 using a linear scaling factor, also referred to as a scaling factor, a boosting factor, a brightening factor and a brightness-boosting factor. The linear scaling factor may be determined such that the brightness is preserved under a predetermined percentage of backlight dimming according to:

$$S = \left(\frac{1}{BL_{reduced}}\right)^{\frac{1}{\gamma}},$$

where S may denote the scaling factor, $BL_{reduced}$ may denote the percentage of backlight dimming and $\gamma$ may denote the LCD system gamma. $BL_{reduced}$ may be a predetermined fixed percentage, for example, 15 percent. The scaling factor, S, may be determined adaptively based on image content. The scaling factor, S, may be computed using the color histogram of the input image. The percentage of backlight dimming, $BL_{reduced}$, may be determined as desired. For example, the percentage of backlight dimming, $BL_{reduced}$, may be determined according to the methods and systems disclosed in U.S. patent application Ser. No. 11/465,436, entitled "Systems and Methods for Selecting a Display Source Light Illumination Level," filed Aug. 17, 2006, which is hereby incorporated by reference herein in its entirety.

Figure 12:
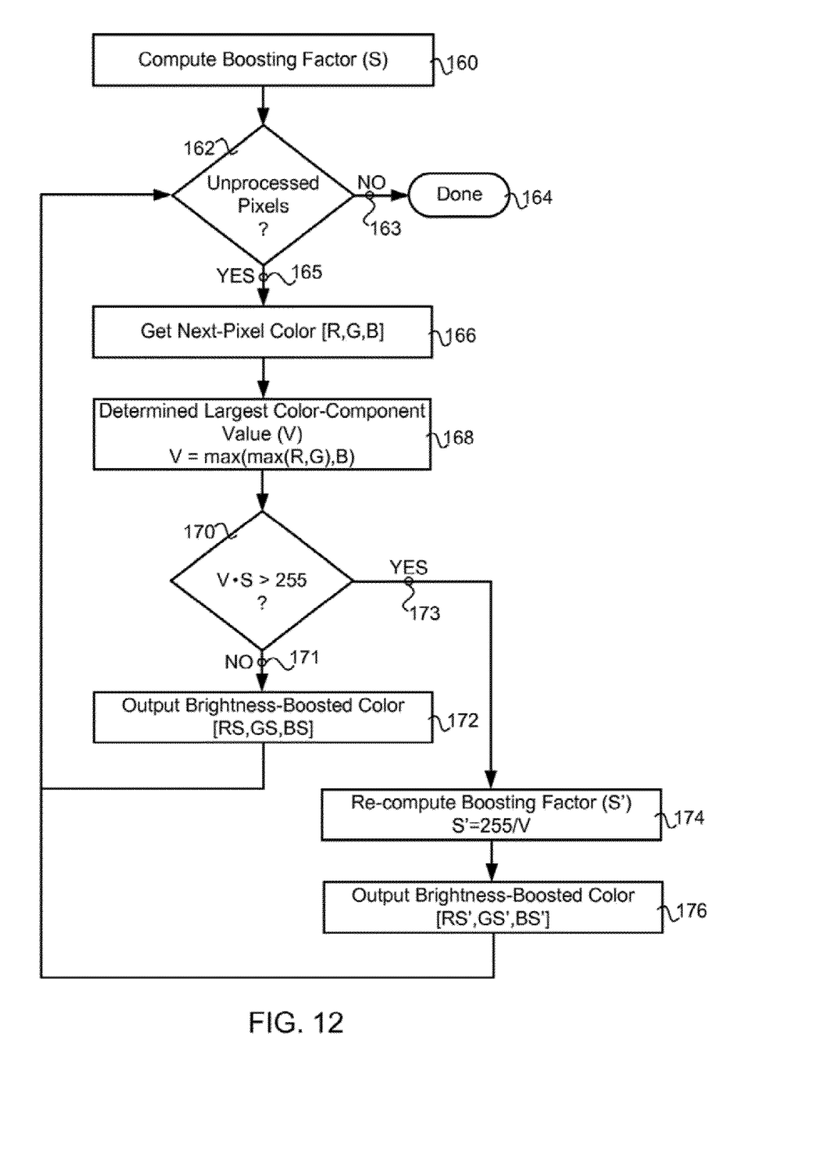
FIG. 12 is a chart showing a brightness-boosting factor that maintains the color ratio across three color channels when clipping occurs.

To avoid a clipping problem, the brightness boosting may comprise per-pixel processing described in relation to FIG. 12. The boosting factor, S, may be computed 160, and a determination 162 may be made as to whether or not there are unprocessed pixels. If there are no 163 unprocessed pixels, then the brightness boosting procedure may terminate 164. If there are 165 unprocessed pixels, then the color-component values, denoted [R,G,B] of the next pixel may be obtained 166. The largest color-component value, which may be denoted V, may be determined 168. V may be determined according to:

$$V = \max(\max(R,G),B).$$

The largest color-component value, V, may be scaled by the boosting factor, S, and the scaled value may be compared 170 to the maximum code value. The maximum code value may be 255. If the scaled value is less than or equal to 171 the maximum code value, the color value associated with the current pixel may be brightness boosted using the scale value, S, and the brightness-boosted color value may be output 172 for the current pixel. A determination 162 may be made as to whether or not there are unprocessed pixels, and the process may continue. If the scaled value is greater than 173 the maximum code value, then the boosting factor may be re-computed according to:

$$S' = \frac{255}{V},$$

where S' may denote the re-computed boosting factor. The color value associated with the current pixel may be brightness boosted using the re-computed boosting factor, S', and the brightness-boosted color value may be output 176 for the current pixel. A determination 162 may be made as to whether or not there are unprocessed pixels, and the process may continue. The color ratio across the three color channels is maintained when clipping occurs, and thus color fidelity is maintained.

A common brightening factor, S, may be used at each pixel, with the exception of pixels for which clipping occurs. Te brightening factor, S, may be spatially varying according to image content. The brightening factor, S, may be determined according to:

$$S(x, y) = \left(\alpha + \exp\left(-\frac{f(x, y)^2}{\sigma^2}\right)\right), \alpha \geq 1,$$

where f (x, y) may be the image brightness at location (x, y), α may be a parameter that controls the range of the brightening factor and a may be a factor that controls the shape of the Gaussian weighting function. For f (x, y) with a range of [0,255], exemplary parameter values of α and σ are 1.6 and 100, respectively. The Gaussian weighting function may produce a larger boosting factor, S (x, y), when the brightness f (x, y) is low. Therefore, a pixel with a low-brightness value may be more heavily brightened than a pixel with a larger brightness value.

The image brightness values may be quantized into a plurality of brightness-value bins, and a brightening factor may be associated with each brightness-value bin. Pixels with brightness values within the same brightness-value bin may be brightened by the same factor, the brightening factor associated with the respective bin. The quantization may be based on a histogram of the brightness values.

RGB input values may be converted to an alternative color space, for example, a luminance-chrominance-chrominance color space. Exemplary luminance-chrominance-chrominance color spaces may include YCbCr, YUV, Lab and other luminance-chrominance-chrominance color spaces. The luminance channel may be brightness boosted while the chrominance channels remain unchanged.

The brightened image 33 generated by the brightness booster 32 and the key-feature image 35 generated by the key-feature estimator 34 may be combined by the combiner 36. The combiner 36 may combine the brightened image 33 and the key-feature image 35 by adding the two images. The combiner 36 may blend the images using a weighted average of the two images according to:

$$I_{KFH}=\beta I_{boosted}+(1-\beta)I_{KFM},$$

where β may denote a blending factor, also referred to as a blending parameter, $I_{KFH}$ may denote the blended image 37, $I_{boosted}$ may denote the brightened image 33 generated by the brightness booster 32 and $I_{KFM}$ may denote the key-feature image 35 generated by the key-feature estimator 34. The blending factor, β, may be a user selected parameter. In alternative embodiments of the present invention, the blending factor, β, may be a predefined value.

The blended image 37 values may be mapped by a code-value mapper 38 to the range of display code values. The range of display code values is [0,255]. The resulting KFH image 39 may be made available from the image-enhancement system 30 to an LCD display.

Figure 13:
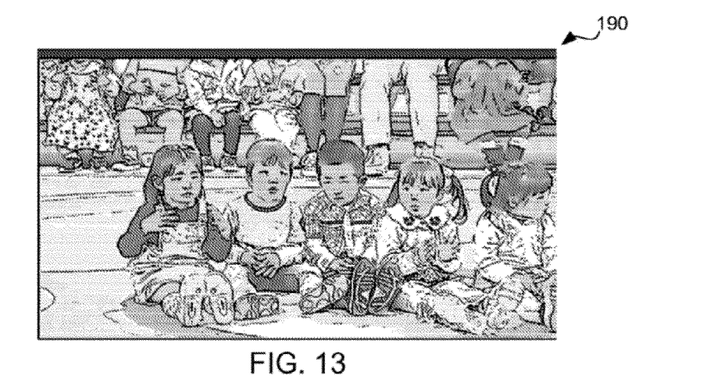
FIG. 13 is a picture depicting a Non-Photorealistic Rendering (NPR) rendition of the input image at full power consumption, shown in FIG. 6.
Figure 14:
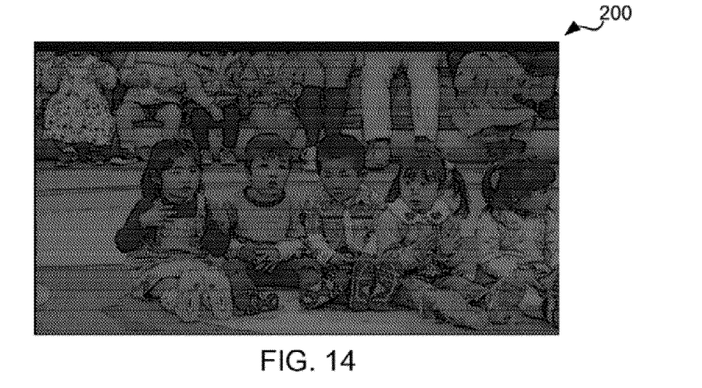
FIG. 14 is a picture depicting an NPR rendition of the exemplary input image, at 2% power consumption, shown in FIG. 6.
Figure 15:
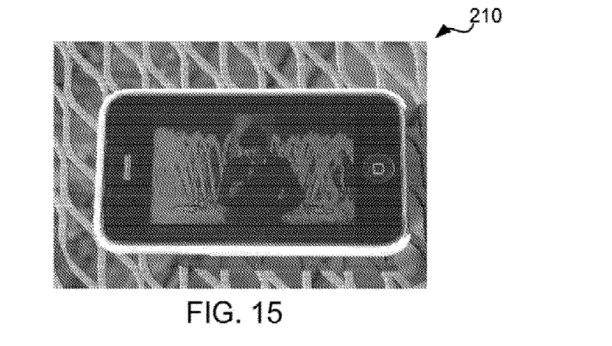
FIG. 15 is a picture depicting an NPR rendition of the exemplary input image, viewed in direct sunlight, shown in FIG. 2.

FIG. 13 depicts the NPR rendition 190 of the input image 100, at full power consumption, shown in FIG. 6. FIG. 14 depicts the NPR rendition 200 of the input image 100, at 2% power consumption, shown in FIG. 6. FIG. 15 depicts the NPR rendition 210 of the input image 20, viewed in direct sunlight, shown in FIG. 2.

Figure 16:
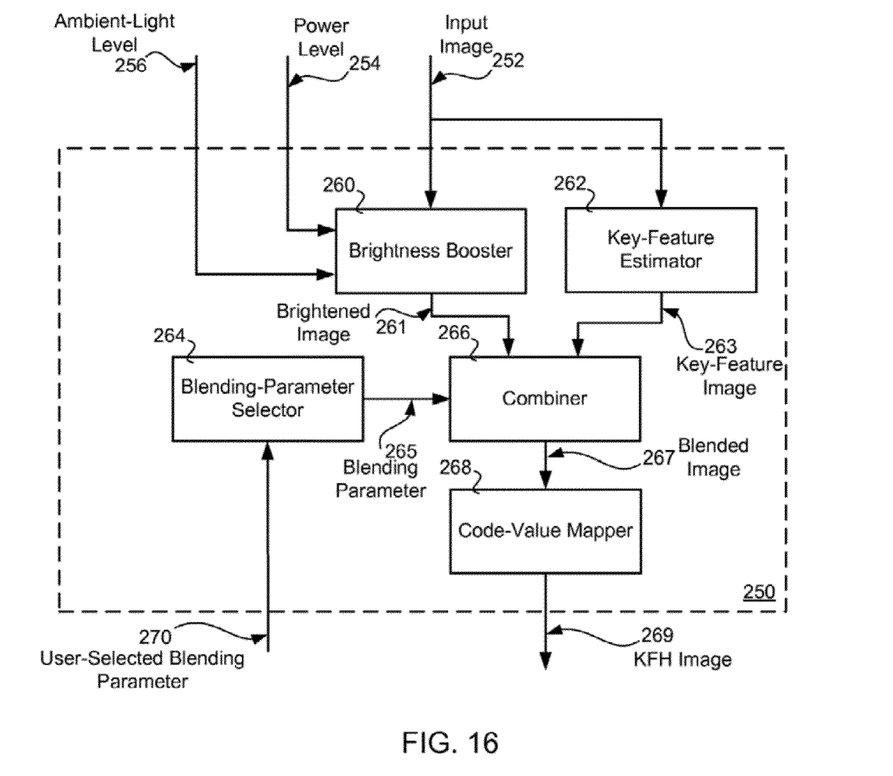
FIG. 16 is a chart showing a brightness booster for boosting the brightness level of an input image, a key-feature estimator for estimating a key-feature map associated with the input image, a combiner for combining the brightness-boosted image and the key-feature map and a blending-parameter selector for determining a blending parameter that is used by the combiner.

Referring to FIG. 16, she system may comprise a brightness booster 260, a key-feature estimator 262, a blending-parameter selector 264, a combiner 266 and a code-value mapper 268. An input image 252, a backlight power level 254 and an ambient-light level 256 may be received by the image-enhancement system 250. The input image may be a color image or a gray-scale image. The input image 252 may be made available to the brightness booster 260 and the key-feature estimator 262. The backlight power level 254 and the ambient-light level 256 may be made available to the brightness booster 260.

The key-feature estimator 262 may produce a key-feature image 263, also considered a key-feature map, associated with the input image 252. The key-feature estimator 262 may generate the key-feature map 263.

The brightness booster 260 may generate a brightened image 261 based on the input image 252 content, the backlight power level 254 and the ambient-light level 256.

The blending-parameter selector 264 may determine the blending parameter 265 used by the combiner 266 to blend the brightened image 261 and the gradient map 263. A user-selected blending parameter 270 may be provided to the blending-parameter selector 264. The user-selected blending parameter 270 may correspond directly to the blending parameter 265. The user-selected blending parameter 270 may be an image-quality setting selected by a user and associated with a blending parameter 265 value by the blending-parameter selector 264. The blending-parameter selector 264 may select a default value for the blending parameter 265 when a user-selected blending parameter 270 is not available.

The combiner 266 may combine the key-feature image 263 and the brightened image 261 based on the blending parameter 265. The combiner 266 may linearly blend the key-feature image 263 and the brightened image 261 using the blending parameter 265 as a weighting factor according to:

$$I_{KFH}=\beta I_{boosted}+(1-\beta)I_{KFM},$$

where β may denote the blending parameter 265, $I_{KFH}$ may denote the blended image 267, $I_{boosted}$ may denote the brightened image 261 generated by the brightness booster 260 and $I_{KFM}$ may denote the key-feature image 263 generated by the key-feature estimator 262. The combiner 266 may combine the key-feature image 263 and the brightened image 261 according to:

$$I_{KFH}=I_{boosted}+I_{KFM}.$$

The blended image 267 values may be mapped by a code-value mapper 268 to the range of display code values. The range of display code values may be [0,255]. The resulting KFH image 269 may be made available from the image-enhancement system 250 to an LCD display.

While the aforementioned techniques are suitable for brightening an image, they tend to be computationally complex and not suitable for computationally efficient real-time embedded systems suitable for video processing.

Figure 17:
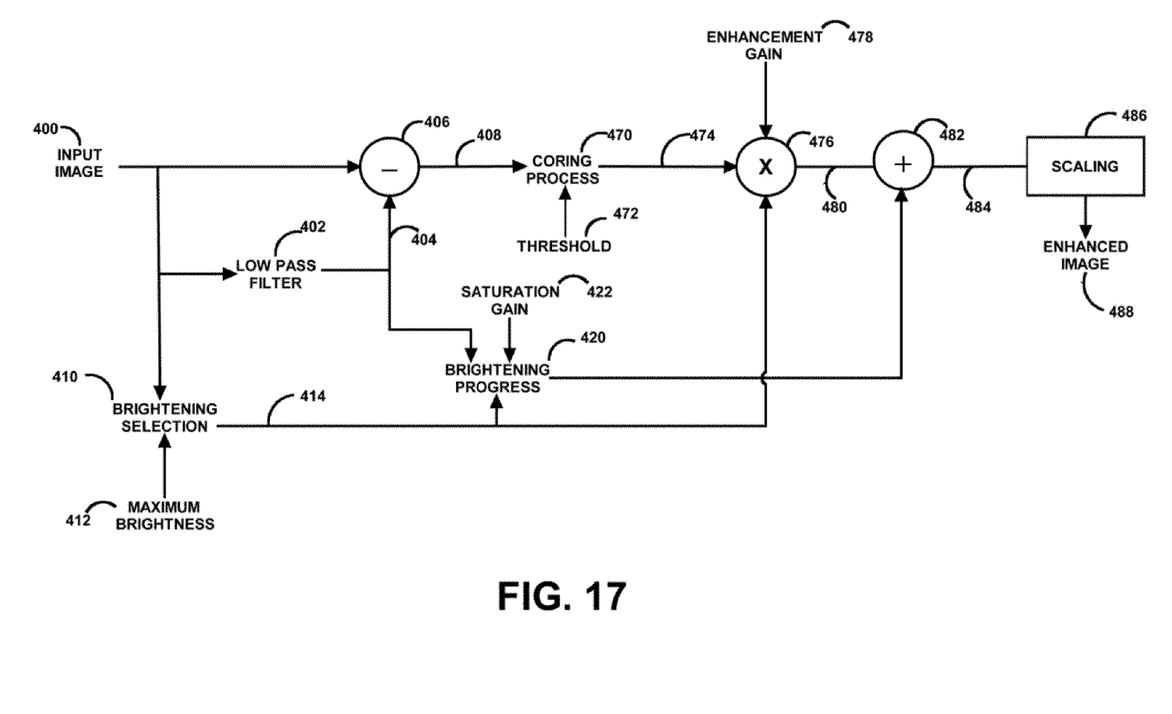
FIG. 17 illustrates an image enhancement technique.

Referring to FIG. 17, a computationally efficient real-time embedded system for brightening an image is illustrated. An input image 400 is received by the system and it was determined that the relatively higher frequency aspects of the input image should be processed by the system in a manner different than the relatively lower frequency aspects of the input image. The relatively lower frequency aspects of the input image tend to identify the smooth aspects of the image while the relatively higher frequency aspects of the input image tend to identify the texture and edge aspects of the input image. To separate the relatively higher frequency aspects of the input image from the relatively lower frequency aspects of the input image, a low pass filter 402, such as a 5×5 filter, may be used. The output of the low pass filter 402 is the relatively lower frequency aspects 404 of the input image 400. The relatively lower frequency aspects of the input image 404 may be subtracted 406 from the input image 400 to identify the relatively higher frequency aspects of the input image 408. Other separation techniques may be used.

A brightening selection 410 may provide a brightening strength measure output which may be determined in any suitable manner. The output of the brightening selection 410 may be based upon the ambient light level value, a selected value, or any other suitable value. The output of the brightening selection 410 may also be based upon a balance of a combination of a pair of terms, namely, (1) an under brightening term (e.g., less than an ideal brightening strength measure) and (2) a clipping term. To determine the brightening strength measure, an error function may be computed based upon the under brightening term and the clipping term, respectively, as follows:

$$\text{Error}(cv, B_i, B_{ideal}) = \begin{cases} (B_i * cv - B_{ideal} * cv)^2 & B_i * cv < cv_{max} \\ (B_i * cv - cv_{max})^2 & B_i * cv \geq cv_{max} \end{cases}$$

where $B_{ideal}$ 412 is the maximum brightening level of an input, $B_i$ is the brightness candidate, and cv is the corresponding code value. This error may be based upon a histogram of the input image. The input image histogram may be weighted by the error function to provide an objective cost function for optimization, as follows:

$$B = \min[\text{Objective}(B_i)] = \min[\Sigma_{cv} \text{Hist}(cv) * \text{Error}(cv, B_i, B_{ideal})]$$

The optimization provides an optimized brightening strength measure 414 from the brightening selection 410 that is adaptive to the image content which provides a balance between the under brightening term and the clipping term. This optimization is typically less than an ideal ambient adaptive brightening strength to provide such a balance.

The optimized brightening strength 414 together with the lower frequency aspects of the input image 404 may be provided to a brightening process 420. The brightening process 420 may also include a saturation gain 422 input.

Figure 18:
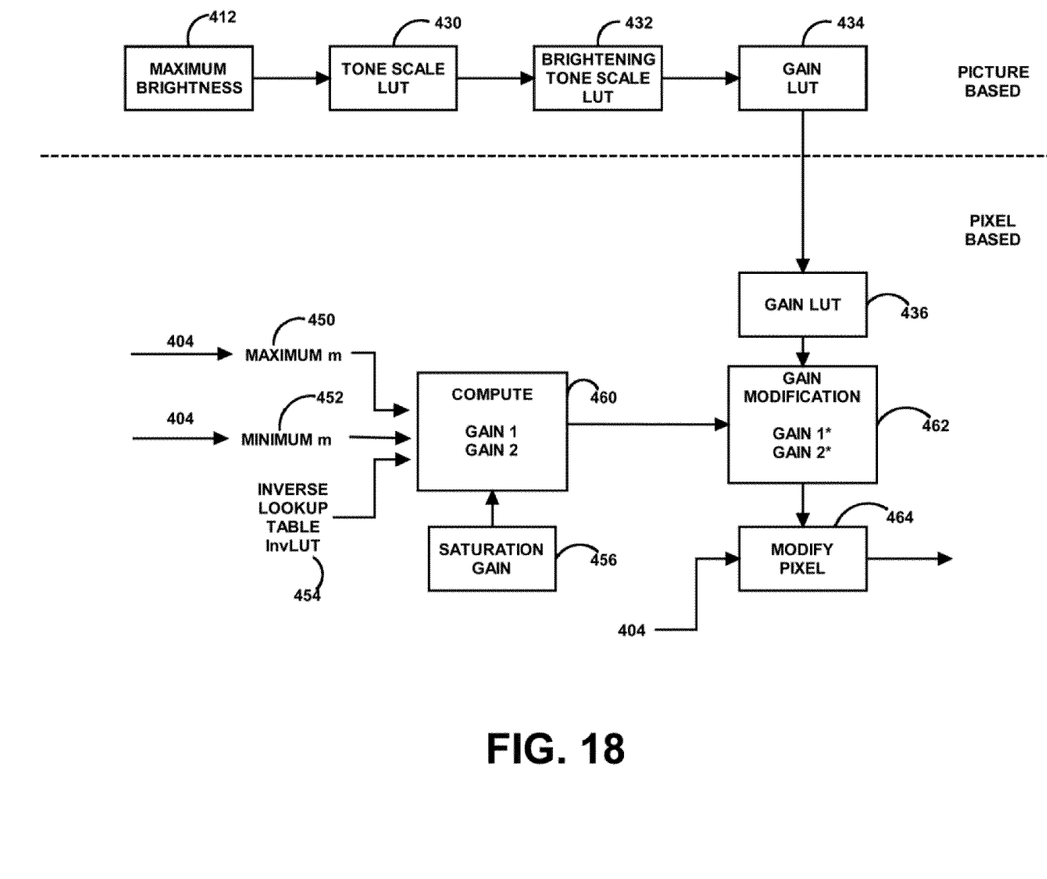
FIG. 18 illustrates a brightening process.
Figure 19:
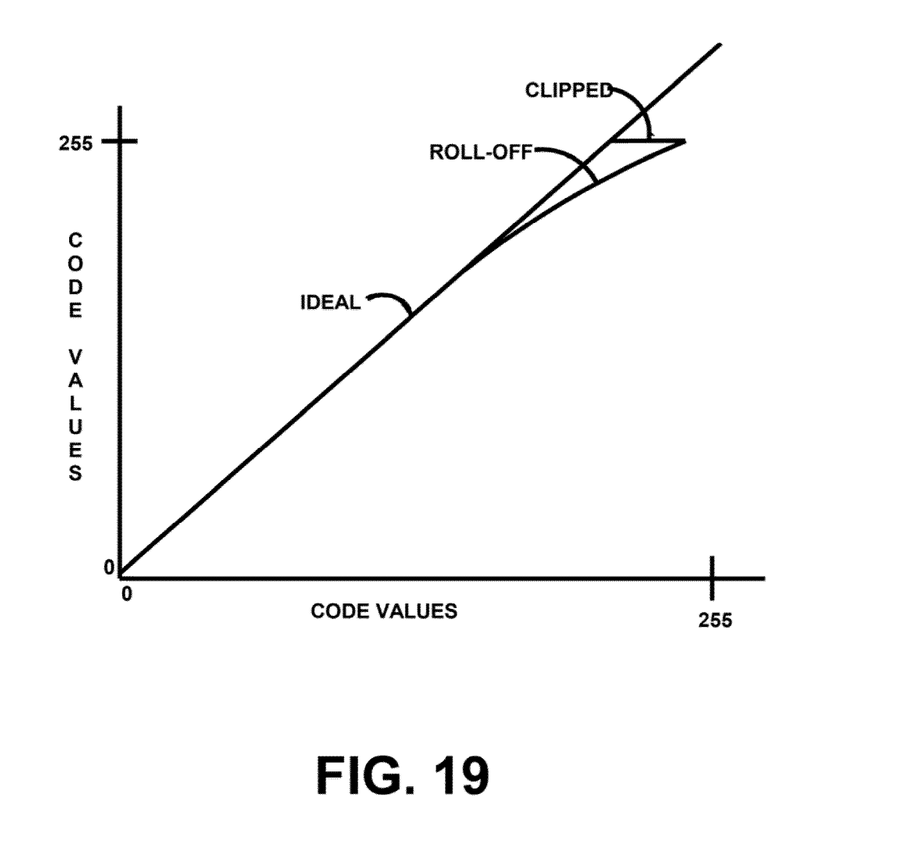
FIG. 19 illustrates a tone scale function.

Referring also to FIG. 18, the brightening selection 410 may be implemented using the maximum brightness 412 to compute a tone scale look up table 430, which tends to result in clipping. The tone scale look up table 430 may be used to compute a brightening tone scale look up table 432, which may be dependent on multiple factors, such as the gamma and the brightening strength. The brightening tone scale look up table 432 may be used to compute a gain look up table 434, which rolls off the tone scale at the upper code values to reduce clipping artifacts and reduce highlights, while having a limited reduction in brightening. The tables 430, 432, 434 may be determined for a picture. The gain look up table 434 may be represented as a multiplier for a pixel 436 as follows:

$$\text{Gain}(x) = \frac{\text{Brightened}(x)}{x},$$

where x represents the pixel code values, and brightened(x) represents a tone scale function, as illustrated in FIG. 19.

While color space conversions may be used for scaling the saturation of a pixel, the conversion of a pixel to a different color space, scaling of the pixel within that coverted color space, and conversion of the scaled pixel back to the original color space with suitable out of gamut corrections requires substantial computational resources. A more computationally efficient technique for a color conversion like effect is to separate the pixel values into (1) a grey level related component and (2) a saturation related component. The grey level component may be the minimum of the pixel values, m=min (R,G,B). The saturation related component may be (r−m, g−m, b−m), where the summation of the two components is the original pixel values. A relative decrease in the amount of grey increases the corresponding saturation, which may be desirable depending on the amount of grey level decrease.

One technique for implementation of such a separation process is for the brightening process 420 to compute the maximum extreme (e.g., M=max(R,G,B)) 450 of the colors of a pixel of the lower frequency aspects of the input image 404 such as red, blue, and green. The brightening process 420 may compute the minimum extreme (e.g., m=min(R,G,B)) 452 of the colors of a pixel of the lower frequency aspects of the input image 404, such as red, blue, and green. An inverse look up table 454 may be used for the selection of inverse values. Inv_m may be set to InvLUT(m) (e.g., 1/m). Inv_M_m may be set to InvLUT(M−m) (e.g., 1/(M−m)). A saturation gain 456 may be selected by the system or otherwise set by the user. A compute Gain1 and Gain2 process 460 may be used to select a suitable gain related to the saturation portion (e.g., Gain1) and a suitable gain related to the grey portion (e.g., Gain2). Gain1 may be set to the saturation gain 456. Gain2 may be set to Inv_m*(M-Saturation Gain*(M−m)). The combination of Gain1 and Gain2 maintains the brightness substantially unchanged. Gain1 and Gain2 may be modified to achieve a joint saturation boost and brightening 462, such as Gain1*=Gain1*BrighteningGain and Gain2*=Gain2*BrighteningGain, where BrighteningGain=GainLUT(M) 436. The output for each pixel from the brightening process 420 may be x=Gain1*(x−m)+Gain2*m for x=R,G,B, from a modify pixel process 464. Gain1* refers to the saturation gain and Gain2* refers to the grey gain.

Referring again to FIG. 17, the relatively higher frequency aspects of the input image 408 may be processed by a coring process 470. The coring process 470 may also include a threshold 472. In general, the coring process 470 provides an output 474 that reduces the smaller pixel values by setting them to zero to reduce the noise in the system. For example, the coring process may set pixel values x to 0 if the abs(x)≤ the threshold 472, or otherwise set the pixel values to x if the abs(x)> threshold 472. The cored high frequency aspects of the input image 474, where the lower amplitude noise is reduced by the coring process 470, may be further modified by an enhancement gain process 476 by a combination of an enhancement gain value 478 and/or the output of the brightening selection process 410. The enhancement gain process 476 enhances the edge details by a global multiplication of the pixel values across the image to provide an enhanced image 480.

The enhanced image 480 representative of the higher frequency aspects of the input image 404 is added by a summation process 482 to the output of the brightening process 420 representative of the lower frequency aspects of the input image 404 to provide a summed image 484. The summed image 484 may be scaled by a scaling process 486. The scaling process may substantially maintain the hue of the pixels the same while mapping the pixel values into a suitable range, such as 0 to 255. For example, an enhanced image 488 provided by the scaling process 486 may be R2, G2, B2=(255/M)*(R1, G1, B1), where R1, G1, B1 is the pixels of the summed image 484, M=max(255, R1, G1, B1). Accordingly, if the maximum is 255 then the scaling is unity, and if the pixel value is negative it is preferably clipped to zero.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A computer-implemented method for enhancing an input image comprising:
    (a) receiving an input image;
    (b) modifying the relatively lower frequency aspects of said input image based upon a brightening process, where said brightening process is based upon a brightening selection which is based upon a combination of an under brightening term and a clipping term and a joint saturation boost and brightening;
    (c) modifying the relatively higher frequency aspects of said input image based upon reducing lower amplitude noise and enhancing the noise reduced higher frequency aspects of said input image;
    (d) combining said modified relatively lower frequency aspects of said input image and said modified relatively higher frequency aspects of said input image;
    (e) wherein said brightening selection is based upon an error function of said under said brightening term and said clipping term;
    (f) wherein said error function is further based upon brightening candidates and code values.

2. A computer-implemented method for enhancing an input image comprising:
    (a) receiving an input image;
    (b) modifying the relatively lower frequency aspects of said input image based upon a brightening process, where said brightening process is based upon a brightening selection which is based upon a combination of an under brightening term and a clipping term and a joint saturation boost and brightening;
    (c) modifying the relatively higher frequency aspects of said input image based upon reducing lower amplitude noise and enhancing the noise reduced higher frequency aspects of said input image;
    (d) combining said modified relatively lower frequency aspects of said input image and said modified relatively higher frequency aspects of said input image;
    (e) wherein said joint saturation boost and brightening results in increased saturation of said input image;
    (f) wherein said joint saturation boost and brightening is based upon a first gain value and a second gain value.

3. The method of claim 2 wherein said first gain value is related to saturation.

4. The method of claim 3 wherein said second gain value is related to a grey level.

5. The method of claim 4 wherein said brightening is based upon a maximum gain value.

6. A method for enhancing an input image suitable to be displayed on a display comprising:
    (a) receiving an input image;
    (b) modifying the relatively lower frequency aspects of said input image based upon a brightening process, where said brightening process is based upon a brightening selection which is based upon a combination of an under brightening term and a clipping term and a joint saturation boost and brightening;
    (c) modifying the relatively higher frequency aspects of said input image based upon reducing lower amplitude noise and enhancing the noise reduced higher frequency aspects of said input image;
    (d) combining said modified relatively lower frequency aspects of said input image and said modified relatively higher frequency aspects of said input image;
    (e) wherein said brightening selection is based upon an error function of said under said brightening term and said clipping term;
    (f) wherein said error function is further based upon brightening candidates and code values.

7. A method for enhancing an input image suitable to be displayed on a display comprising:
    (a) receiving an input image;
    (b) modifying the relatively lower frequency aspects of said input image based upon a brightening process, where said brightening process is based upon a brightening selection which is based upon a combination of an under brightening term and a clipping term and a joint saturation boost and brightening;
    (c) modifying the relatively higher frequency aspects of said input image based upon reducing lower amplitude noise and enhancing the noise reduced higher frequency aspects of said input image;
    (d) combining said modified relatively lower frequency aspects of said input image and said modified relatively higher frequency aspects of said input image;
    (e) wherein said joint saturation boost and brightening results in increased saturation of said input image;
    (f) wherein said joint saturation boost and brightening is based upon a first gain value and a second gain value.

8. The method of claim 7 wherein said first gain value is related to saturation.

9. The method of claim 8 wherein said second gain value is related to a grey level.

10. The method of claim 9 wherein said brightening is based upon a maximum gain value.

* * * * *